C. B. PATCH.
FRICTION GEAR HAVING REMOVABLE FRICTION SHELLS.
APPLICATION FILED OCT. 25, 1916.
1,300,480.
Patented Apr. 15, 1919.
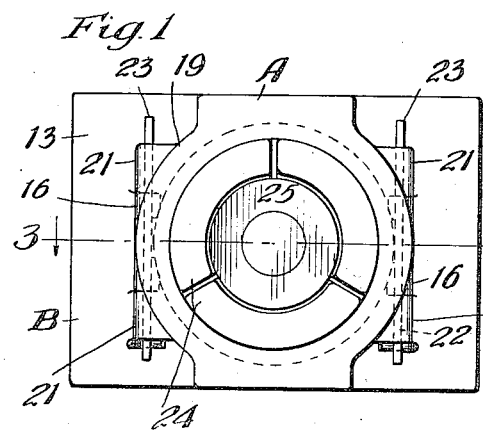
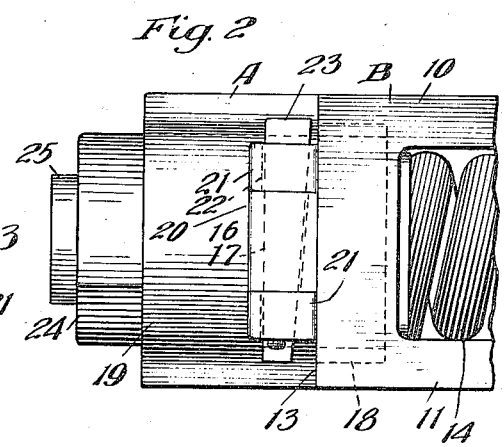
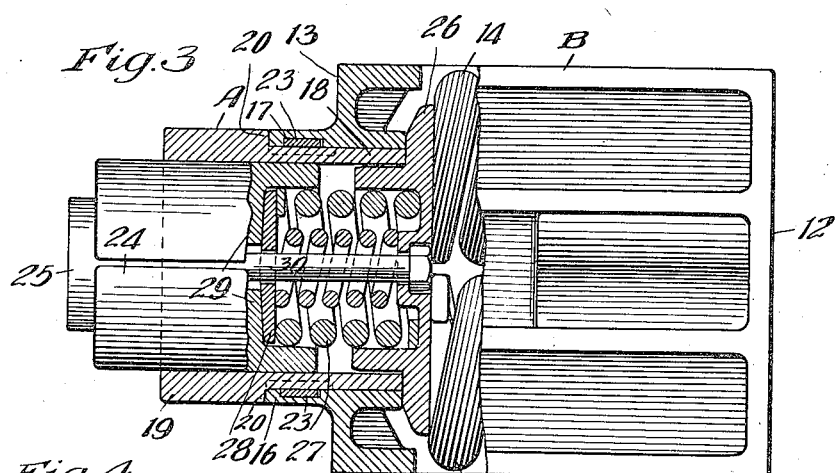
WITNESSES:
Wm. Geiger
INVENTOR.
Calvin B. Patch
BY George R. Haight
His ATTORNEY

UNITED STATES PATENT OFFICE.

CALVIN B. PATCH, OF GLENELLYN, ILLINOIS, ASSIGNOR TO WILLIAM H. MINER, OF CHAZY, NEW YORK.

FRICTION-GEAR HAVING REMOVABLE FRICTION-SHELLS.

1,300,480.  Specification of Letters Patent.  Patented Apr. 15, 1919.

Application filed October 25, 1916. Serial No. 127,514.

*To all whom it may concern:*

Be it known that I, CALVIN B. PATCH, a citizen of the United States, residing at Glenellyn, in the county of Dupage and State of Illinois, have invented a certain new and useful Improvement in Friction-Gears Having Removable Friction-Shells, of which the following is a full, clear, concise, and exact description, reference being had to the accompanying drawings, forming a part of this specification.

This invention relates to improvement in friction gears having removable friction shells.

The object of the invention is to provide a friction gear housing or combined friction shell and spring cage wherein the friction shell proper, or part which receives the greatest wear, may be readily renewed when desired, whereby the life of the housing may be increased with minimum expense.

In the drawing forming a part of this specification, Figure 1 is a front end elevation of a friction gear showing my improvements in connection therewith. Fig. 2 is a side elevation of the structure illustrated in Fig. 1, part being broken away in order to prevent crowding. Fig. 3 is a part horizontal section, part top plan of the structure illustrated in Fig. 1, the section being taken on line 3—3 of the latter. Fig. 4 is an elevation of the inner end of the friction shell proper. And Fig. 5 is a front end elevation of the spring retaining member.

In said drawing, the friction gear housing or casting, comprises a friction shell proper A, and a spring container member B. The latter is of a well known form, being of substantially rectangular cross section with integral upper wall 10, lower wall 11, rear wall 12 and front wall 13, the member B being open at its sides to permit the insertion of the main springs 14—14. At its front end, the member B is provided with a circular opening or recess 15 and diametrically disposed forwardly extending lugs 16—16, the latter having vertically extending recesses 17 formed therein, said recesses being tapered for the purpose hereinafter described.

The friction shell proper A is of substantially cylindrical or annular form and is provided with a rearwardly extending portion 18 of lesser diameter than the outer portion 19. The annular portion 18 is adapted to snugly fit the recess 15 in the member B and said member A is also provided with a pair of diametrically disposed shoulders 20—20 which, when the member A is inserted within the member B, engages the lugs 16. As will be understood, pressure from the member A to the member B is transmitted from the cylindrical portion of A to rectangular portion of B where they contact on either side of lugs or bosses, thus providing simple and effective means for transmitting the shocks to the member B which acts as the column. Above and below the shoulders 20, the member A is provided with alined lugs 21—21 also having vertically extending recesses 22—22 therein, said recesses 22 being tapered to correspond with the recesses 17. When the members A and B are assembled in the position shown in Figs. 1, 2, and 3, they are held in such position by means of vertically extending, tapered keys 23 which pass through the slots 22 and 17 and, on account of the taper of said slots, said keys are adapted to firmly wedge the members A and B into tight engagement.

I have shown friction elements of a well known form associated with the gear housing. These comprise a series of friction shoes 24, a wedge 25, a main spring follower 26, a preliminary spring 27 and a washer 28 bearing against inwardly extending flanges 29 formed on the shoes. A retaining bolt 30 is passed through the follower 26, spring 27, washer 28 and wedge 25 for holding the parts in assembled position.

As will be apparent from the foregoing description, the friction cylinder A may be readily renewed or replaced and the same easily assembled with the member B by means of the male and female joint shown and the two parts held in tight engagement by means of the wedge key.

I claim:

1. A friction gear housing comprising, a spring container member and a separate friction shell member, said members being provided with a male and female joint, and means for holding said members against separation, said means comprising over-lapping and interfitting recessed lugs on said members and keys extending through said recesses and thereby placed under shear.

2. A friction gear housing comprising, a spring container member and a separate friction shell member, said spring container member having a circular recess at its forward end and provided with a shoulder, the friction shell member having a rearwardly extending annular portion of reduced external diameter and provided also with a shoulder, said annular portion fitting within said circular recess and the shoulders abutting, and means for holding the parts in assembled relation, said means comprising overlapping recessed lugs on said members and wedge shaped keys passing through the recesses.

3. In a friction gear housing for draft gears comprising, a spring container member of substantially rectangular hollow form and having a circular recess at its front end, and a separate friction shell member having an annular extension adapted to fit within said circular recess, said members having coöperating engaging shoulders limiting inward movement of the shell member relatively to the spring container member, and means for holding said members in assembled relation, said means including diametrically disposed sets of over-lapping lugs on said members, said lugs being provided with tapering recesses extending therethrough, and tapering keys extending through said recesses adapted to firmly wedge the parts into tight engagement.

In witness that I claim the foregoing I have hereunto subscribed my name this 19th day of Oct. 1916.

CALVIN B. PATCH.

Witnesses:
 GOLDIE A. BISHOP,
 ELIZABETH M. BRITT.